Oct. 31, 1933.  E. G. ARCHER  1,933,359
CHASSIS CONSTRUCTION
Filed Oct. 19, 1932
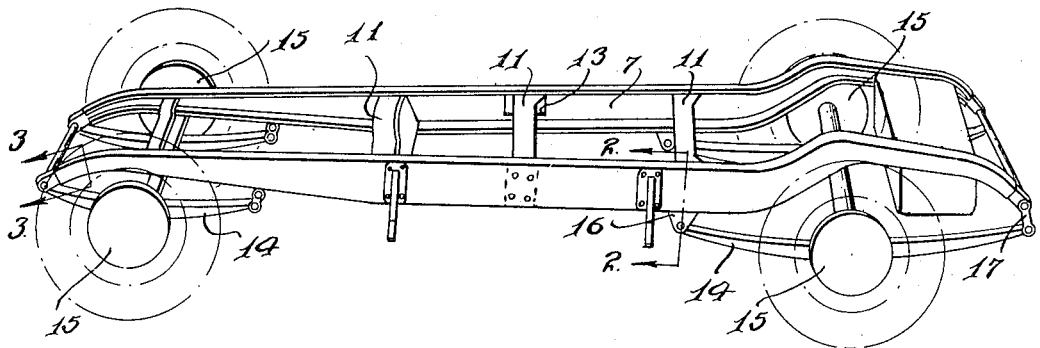
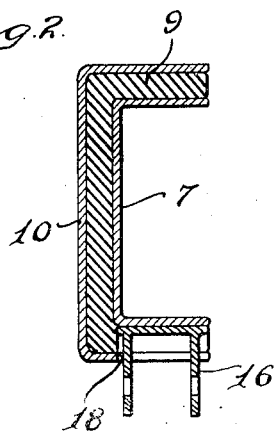
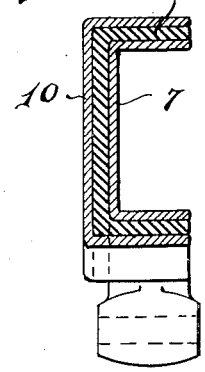
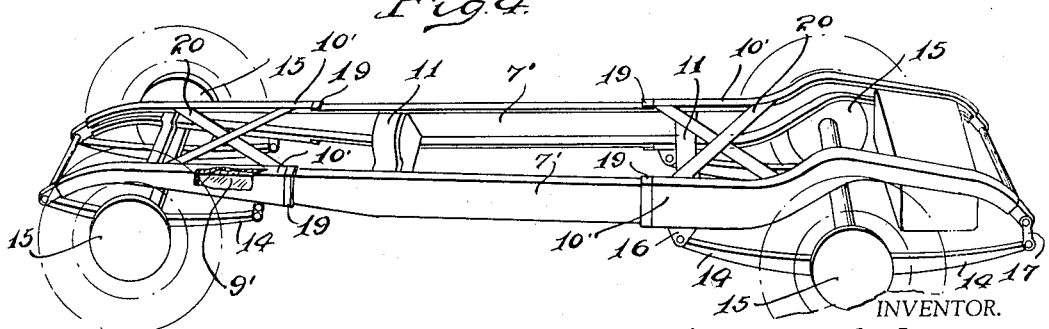
INVENTOR.
EDMUND G. ARCHER.
BY
ATTORNEY.

Patented Oct. 31, 1933

1,933,359

UNITED STATES PATENT OFFICE 1,933,359

CHASSIS CONSTRUCTION

Edmund G. Archer, Pontiac, Mich.

Application October 19, 1932. Serial No. 638,473

6 Claims. (Cl. 280—106)

My invention relates to a new and useful improvement in a chassis construction in vehicles and particularly vehicles of the automotive type in which there is provided a chassis or support for the engine or propelling mechanism and the traction wheels and a chassis or support for the body or super-structure so arranged and co-related that vibration from the engine and shocks and jars delivered to the engine supporting chassis through the traction parts will not be transmitted to the body or superstructure, and to provide such a structure is the object of the present invention.

It is another object of the present invention to provide a chassis or supporting structure for the traction wheels and engine separate from a chassis or supporting structure for the body or super-structure, and yet so related and associated together that objectionable independent movements of these parts will be avoided.

It is another object of the present invention to provide a vehicle chassis construction in which a rigid structure will be afforded, and shocks and jars and vibrations transmitted through the engine or the traction parts will not be delivered to the body and superstructure.

It is another object of the invention to provide in a chassis a pair of cooperating supporting parts insulated from each other by yieldable sound deadening material so that a smoothness in riding will be effected and a minimum of noise will result from the use of such a structure.

Other objects will appear hereinafter.

The invention consists in the combination and arrangement of parts hereinafter described and claimed.

The invention will best be understood by a reference to the accompanying drawing which forms a part of this specification and in which, Fig. 1 is a perspective view of the invention, Fig. 2 is a sectional view taken on line 2—2 of Fig. 1.

Fig. 3 is a sectional view taken on line 3—3 of Fig. 1.

Fig. 4 is a perspective view of a modified form of the invention.

The chassis comprises oppositely disposed inner side rails 7, which are preferably formed channel shaped and which are embraced by a channel shaped strip of insulating or sound deadening material, 9, which is of a yieldable nature, being formed from leather, rubber, or the like. Embracing the strip 9 of insulating material are the outer side rails 10 which are also similarly shaped so that at each side of the vehicle the chassis consists of an inner side rail and an outer side rail spaced from each other by an interposed layer of sound deadening, yieldable insulating material. In order that the desired rigidity may be provided the inner rails 7, are connected by cross bars or braces 11, as are likewise the outer rails 10. The straps 9 of insulating material and the inner rails 7 are cut away as at 13 so that there is clearance between the inner rails 7 and the cross bars which connect the outer rails 10.

The engine is mounted by any suitable attaching means to the inner rails 7, and the springs 14, mounted on axles on which the traction wheels 15 are mounted are connected to the bracket 16 and shackles 17 which are attached to the inner rails 7. As shown in Fig. 2, the strip 9 and the outer rail 10 are cut away as at 18 to provide clearance for the bracket 16.

The body or super-structure, including the running boards and fenders, is mounted on the outer rail 10, all these parts being attached to the outer rail in any suitable manner.

When the chassis is constructed in this manner the vibration resulting from the operation of the engine is not transmitted to the body, as the same is absorbed in the layer 9 of insulating material, which is sufficiently yieldable to absorb these vibrations. The shocks and jars transmitted through the traction wheels 15 will be delivered to the inner rail 7 and consequently will not be transmitted to the body or superstructure on account of the presence of the insulation 9.

In the form shown in Fig. 1 the outer rail extends substantially throughout the length of the inner rail 7. This rail, however, may be made in sections if desired and preferably spaced apart. In the form shown in Fig. 4, as indicated, the outer rail 10' is formed shorter than the inner rail 7' and the strips 9' of insulation are suitably held against longitudinal movement by the abutment blocks 19. Diagonally directed brace bars 20 serve to provide the desired rigidity in the construction.

While I have illustrated and described the preferred form of construction I do not wish to limit myself to the precise details of structure shown, but desire to avail myself of such variations and modifications as come within the scope of the appended claims.

Having thus described my invention what I claim is new and desire to secure by Letters Patent is:

1. A vehicle chassis construction of the class described comprising oppositely disposed inner side rails; means for connecting said side rails together; oppositely disposed outer side rails extending parallel in spaced relation to the inner side rails; means for connecting said outer side rails, said means being non-contacting with the inner side rails; and yieldable sound deadening material positioned between the inner and outer side rails for spacing the same apart.

2. A vehicle chassis construction of the class described comprising oppositely disposed outer side rails of channel formation; a similarly shaped strip of yieldable sound deadening material embracing the inner rails; and a channel shaped outer rail embracing said layer; and securing brackets secured to the inner rail, said strip and said outer rail being cut away in the location of said bracket for permitting the projection of same therethrough.

3. A vehicle chassis construction of the class described comprising oppositely disposed inner side rails; oppositely disposed outer side rails each extending parallel to one of said inner rails and in spaced relation thereto; a layer of sound deadening, yieldable material between the inner and outer side rails for maintaining the same in spaced relation; means for connecting said outer side rails together; and means for connecting said inner side rails together, the connecting means for said outer side rails being non-contacting with said inner side rails.

4. A vehicle chassis construction of the class described comprising oppositely disposed inner side rails; oppositely disposed outer side rails, each extending parallel to one of said inner rails and in spaced relation thereto; a layer of sound deadening, yieldable material between the inner and outer side rails for maintaining the same in spaced relation; means for connecting said outer side rails together; means for connecting said inner side rails together, the connecting means for said outer side rails being non-contacting with said inner side rails; and supporting brackets mounted on said inner side rails and projecting through openings formed in the outer side rails and the layer of spacing material.

5. A vehicle chassis construction of the class described comprising: oppositely disposed inner side rails; oppositely disposed outer side rails extending parallel in spaced relation to the inner side rails; means for connecting said outer side rails, said means being non-contacting with the inner side rails; and yieldable sound deadening material positioned between the inner and outer side rails and spacing the same apart.

6. A vehicle chassis construction of the class described comprising: a set of oppositely disposed inner side rails; a set of oppositely disposed outer side rails extending parallel in spaced relation to the inner side rails; yieldable sound deadening material positioned between the inner and outer side rails for spacing the same apart; and means for connecting the rails of a set together, said means being non-contacting with the rails in the other set.

EDMUND G. ARCHER.